M. HANSEN.
EYEGLASSES OR SPECTACLES.
APPLICATION FILED MAR. 31, 1919.
1,358,200.
Patented Nov. 9, 1920.
2 SHEETS—SHEET 1.
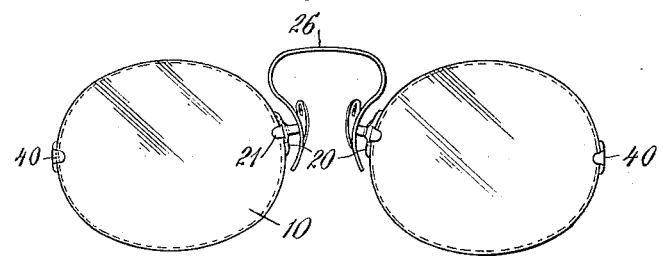
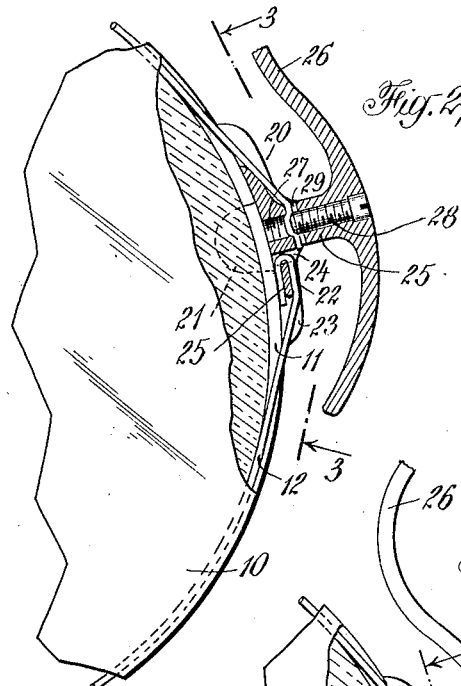
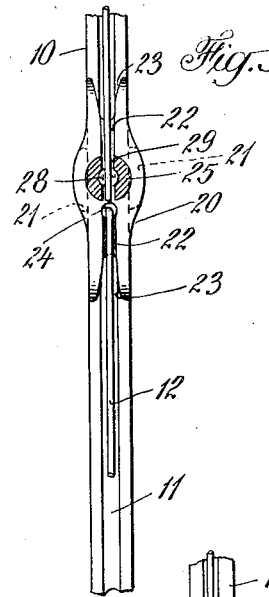
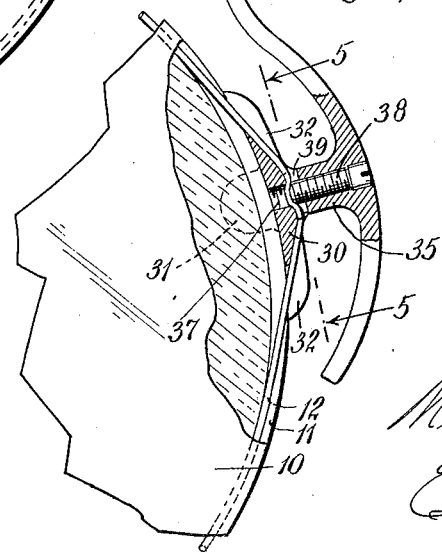
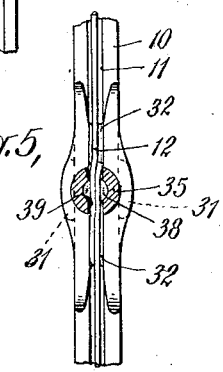
INVENTOR
Mannius Hansen
BY
E. W. Marshall
ATTORNEY

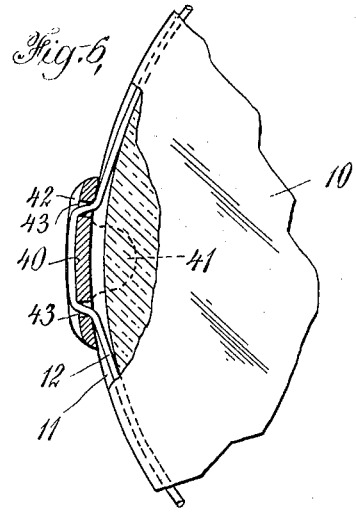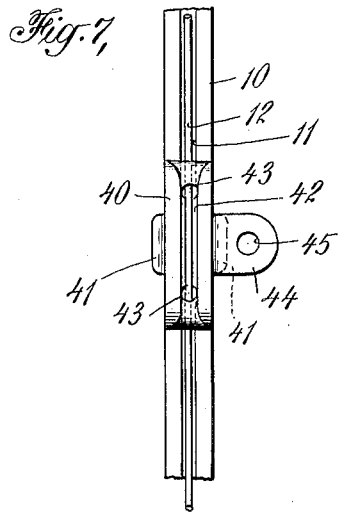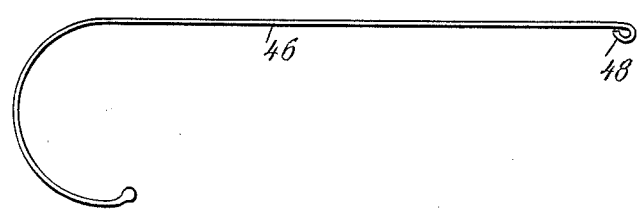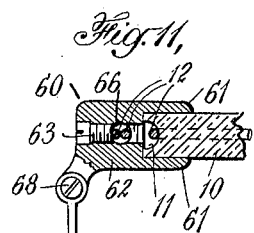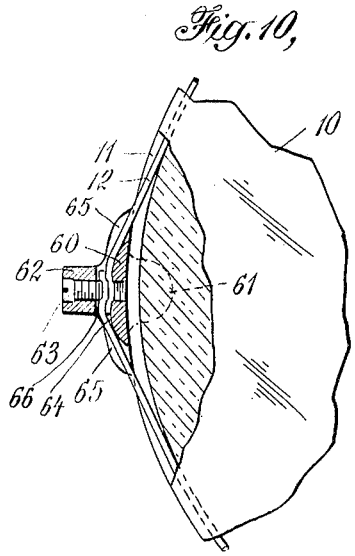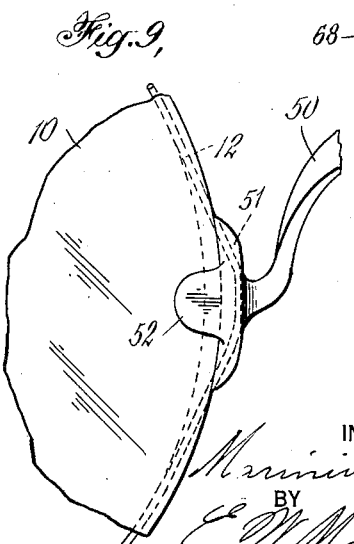

UNITED STATES PATENT OFFICE.

MARINIUS HANSEN, OF BROOKLYN, NEW YORK, ASSIGNOR TO MAX SIEGEL, OF BROOKLYN, NEW YORK.

EYEGLASSES OR SPECTACLES.

1,358,200.  Specification of Letters Patent.  Patented Nov. 9, 1920.

Application filed March 31, 1919. Serial No. 286,341.

*To all whom it may concern:*

Be it known that I, MARINIUS HANSEN, a subject of the King of Norway, and a resident of Brooklyn, Kings county, and State of New York, United States of America, have invented certain new and useful Improvements in Eyeglasses or Spectacles, of which the following is a specification, reference being had to the accompanying drawings, forming a part thereof.

My invention relates to improvements in eye glasses or spectacles, and more particularly to that type of such devices in which the lenses are secured to the mountings by means of small wires embedded in grooves in the edges of the lens in such a way as to be practically invisible. Its object is to provide a simple, inexpensive and effective anchorage for the end or ends of the wire.

Another object is to provide a construction by means of which either one or both ends of each wire may be secured by a single screw.

Another object is to provide a construction which is applicable to either eye glasses or spectacles.

Another object is to provide means for either securing lenses to eye glass or spectacle mounting or for securing clips or other devices to the lenses.

In order that my invention may be thoroughly understood, I will now proceed to describe the same in the following specification, and will then point out the novel features thereof in appended claims.

Referring to the drawings:

Figure 1 is an elevation of a pair of eye glasses which are made according to and embody this invention.

Fig. 2 is a sectional elevation on a larger scale, of a part of one of the lenses and a part of the mounting therefor of the form shown in Fig. 1, together with the ends of the wire.

Fig. 3 is a sectional end elevation of the parts shown in Fig. 2, the section being taken on the line 3—3 of the latter figure.

Fig. 4 is a view corresponding with Fig. 2 showing a modified form of construction.

Fig. 5 is a sectional end elevation of the parts shown in Fig. 4. The section in this figure is taken on the line 5—5 of Fig. 4.

Fig. 6 is a sectional elevation of the clip shown in Fig. 1, illustrating the manner in which it is secured to the lens.

Fig. 7 is an end view of the parts shown in Fig. 6.

Fig. 8 is an elevation of a temple which may be detachably secured to the clip shown in Figs. 6 and 7.

Fig. 9 shows a part of the lens and a part of the bridge of a pair of spectacles in elevation and illustrates the manner in which the bridge is secured to the lens by the wire.

Fig. 10 is an elevation of the other end of the lens showing the holding strap by means of which the ends of the wire are fastened.

Fig. 11 is a plan view of the parts shown in Fig. 10.

Like characters of reference designate corresponding parts in all the figures.

10 designates a lens in the periphery of which is a groove 11; a wire 12 encircles the lens and is embedded in this groove. The wire is of small diameter so that it is practically invisible. 20 is a strap member, the outer surface of which is of practically the same contour as that of the part of the lens against which it abuts. On each side of the lens are lugs or ears 21 spaced apart substantially the same distance as the thickness of the lens. In the outer surface of the strap member is a groove 22 for the reception of the wire 12 which groove is cut through the body of the strap at its ends as shown at 23. 24 is a hole drilled through the strap near the central portion thereof and 25 is a groove in the outer surface of the strap member extending downwardly parallel with the groove 22. The strap member has a post 25 by means of which it is connected with the bow 26 of the glasses. Through this post is a threaded hole 27 in which is a locking screw 28. 29 is a small hole drilled through the post at right angles to the threaded hole 27 and through the center of this threaded hole.

Before specifically describing the structures shown in the other figures of the drawings, I will describe the manner in which the arrangement shown in Figs. 1, 2 and 3 is used. One end of the wire 12 is passed through the hole 24 and is bent back and pinched together so that a part of it lies in the groove 22 and the other part lies in the groove 25. The wire is then passed around the lens and its other end laid in the groove 22 and passed through the hole 29. The wire is then pulled until it has the desired amount of tension and while held under tension is locked by screwing in the screw 28. In this simple manner an effective lock for the wire is obtained.

In Figs. 4 and 5 the strap member is designated by 30. This has the ears 31 and the grooves 32 similar to those already described. It also has a post 35 in which is a threaded hole 37 for the reception of a locking screw 38. Through the post is drilled a small hole 39 for the reception of the wire 12. In this case both ends of the wire are passed through the hole 38 and while the wire is held under tension it is locked in place by screwing in the screw 38.

40 is a clip which comprises a pair of spaced ears 41. Its outer surface is grooved as shown at 42 and two holes 43—43 are drilled through it. When placed at the desired part of the lens and threaded by the engagement of the ears 41 with the surfaces of the lens, the wire 12 is threaded through one of these holes 43 and laid along the groove 41 and threaded back through the other hole 43 and then continued around the lens to the strap where its ends are anchored. The clip is thus securely held in place. The clip comprises a lug 44 which is perforated at 45 for the reception of a cord or chain or other device.

The temple shown at 46 in Fig. 8 has a hook end 48 by means of which it may be detachably secured to the clip and it is obvious that if one of these clips is provided on both of the lenses such temples can be secured to the clips and the eye glasses thus be used as spectacles.

When it is desired to embody this invention in a spectacle structure, the arrangement shown in Figs. 9, 10 and 11 is used. In these figures 50 is the bridge of the spectacle. This has a grooved portion 51 which is adapted to lie against the edge of the lens and a pair of ears 52 which fit over the surfaces of the lens. As in the case of the clip shown in Fig. 6, the part of the bow which is adjacent the lens is perforated and grooved so that the wire 12 may be threaded through the holes and laid in the groove to secure the bridge to the lens. In this case at the opposite end of the lens is a strap 60 having a pair of ears 61 and a post 62 in which is a threaded hole for holding the locking screw 63. The outside of the strap is grooved as at 64 and provided with two perforations 65 through which the wire 12 may be threaded. There is also a small hole 66 drilled through the post 62 through which the ends of the wire may be threaded. As in the former case the wire is held under tension and locked in place by screwing in the screw 63. Fig. 11 shows that the temples 67 of the spectacles are pivoted to the post 62 at 68.

I have shown and described several forms of my invention for the purpose of showing that it is not limited to any specific form of structure and in fact I intend no limitations other than those imposed by the appended claims.

What I claim is:

1. A lens having a groove in its edge, a wire encircling the lens in the groove, a strap member provided with two intersecting apertures, one of which is adapted to receive the wire and the other of which is threaded, and a locking screw for the wire in the threaded aperture.

2. A lens having a groove in its edge, a wire encircling the lens in the groove, a strap member adapted to lie against the edge of the lens and provided on the side thereof away from the lens with a groove parallel with the groove in the lens, said member having a hollow threaded post provided with a transverse aperture for the reception of the wire, and a locking screw for the wire in the threaded post.

3. A lense having a groove in its edge, a wire encircling the lens in the groove, a strap member adapted to lie against the edge of the lens and provided on the side thereof away from the lens with a groove parallel with the groove in the lens, and on the opposite side with a shorter parallel groove with an aperture between the grooves, said member having a hollow threaded post provided with a transverse aperture for the reception of one end of the wire, and a locking screw for the wire in the threaded post, the other end of the wire being threaded through the aperture between the grooves and bent down into said grooves.

4. A lens having a groove in its edge, a wire encircling the lens in the groove, a member lying against the edge of the lens provided with two perforations and an interconnecting groove, said wire being threaded through said perforations and lying in the groove, a strap member, and means for securing both ends of the wire to said strap member.

5. A lens having a groove in its edge, a wire encircling the lens in the groove, a member lying against the edge of the lens provided with two perforations and an interconnecting groove, said wire being threaded through said perforations and lying in the groove, a strap member provided with two intersecting apertures, one of which is adapted to receive the wire and the other of which is threaded, and a locking screw for the wire in the threaded aperture.

6. A lens having a groove in its edge, a wire encircling the lens in the groove, a member lying against the edge of the lens provided with two perforations and an interconnecting groove, said wire being threaded through said perforations and lying in the groove, a strap member adapted to lie against the edge of the lens and provided on the side thereof away from the lens with a groove parallel with the groove in the lens, and on the opposite side with a shorter parallel groove with an aperture between the grooves, said member having a hollow threaded post provided with a transverse aperture for the reception of one end of the wire, and a locking screw for the wire in the threaded post, the other end of the wire being threaded through the aperture between the grooves and bent down into said grooves.

7. A lens having a groove in its edge, a wire encircling the lens in the groove, a member lying against the edge of the lens provided with two perforations and an interconnecting groove, said wire being threaded through said perforations and lying in the groove, a temple, means for connecting said temple with said member, and means for fastening the ends of said wire.

8. A lens having a groove in its edge, a wire encircling the lens in the groove, a member lying against the edge of the lens provided with two perforations and an interconnecting groove, said wire being threaded through said perforations and lying in the groove, a temple, means for connecting said temple with said member, a strap member lying against the edge of the lens opposite said first mentioned member, and means for securing the ends of the wire to said strap member.

In witness whereof I have hereunto set my hand this 1st day of March, 1919.

MARINIUS HANSEN.

Witness:
EDWARD J. GAYNOR.